United States Patent

[11] 3,617,688

| [72] | Inventor | Allen A. Fogelstrom |
| | | Sun Valley, Calif. |
| [21] | Appl. No. | 845,706 |
| [22] | Filed | July 29, 1969 |
| [45] | Patented | Nov. 2, 1971 |
| [73] | Assignee | SSP Industries |
| | | Burbank, Calif. |

[54] TACK WELDING TORCH
2 Claims, 8 Drawing Figs.

[52] U.S. Cl. .................................... 219/130, 219/127
[51] Int. Cl. .................................... B23k 9/00
[50] Field of Search ........................... 219/130, 75, 74, 127

[56] References Cited
UNITED STATES PATENTS

| 2,550,495 | 4/1951 | Pilia .............................. | 219/127 |
| 2,868,954 | 1/1959 | Skinner et al. ................. | 219/137 X |
| 2,892,925 | 6/1959 | Butterfield et al. ............. | 219/127 |
| 2,952,232 | 9/1960 | Sipala ........................... | 228/53 |
| 3,101,689 | 8/1963 | Hammond et al. ............. | 226/128 |
| 3,469,069 | 9/1969 | Allen ............................ | 219/130 |

Primary Examiner—J. V. Truhe
Assistant Examiner—George A. Montanye
Attorney—Huebner & Worrel ABSTRACT: A tack welding torch adapted to be used in inert-gas-shielded-arc welding. The torch includes a handle means including a self-contained welding wire supply and means for urging said wire through said handle into contact with metal to be welded. Said torch also includes current control means for energizing said welding wire and insulating shield means disposed around the area to be welded. Mounted within the insulating shield means is an adjustable electrode in proximity to said welding wire.

PATENTED NOV 2 1971 3,617,688

INVENTOR.
ALLEN A. FOGELSTROM
BY
Huebner & Worrel
ATTORNEYS.

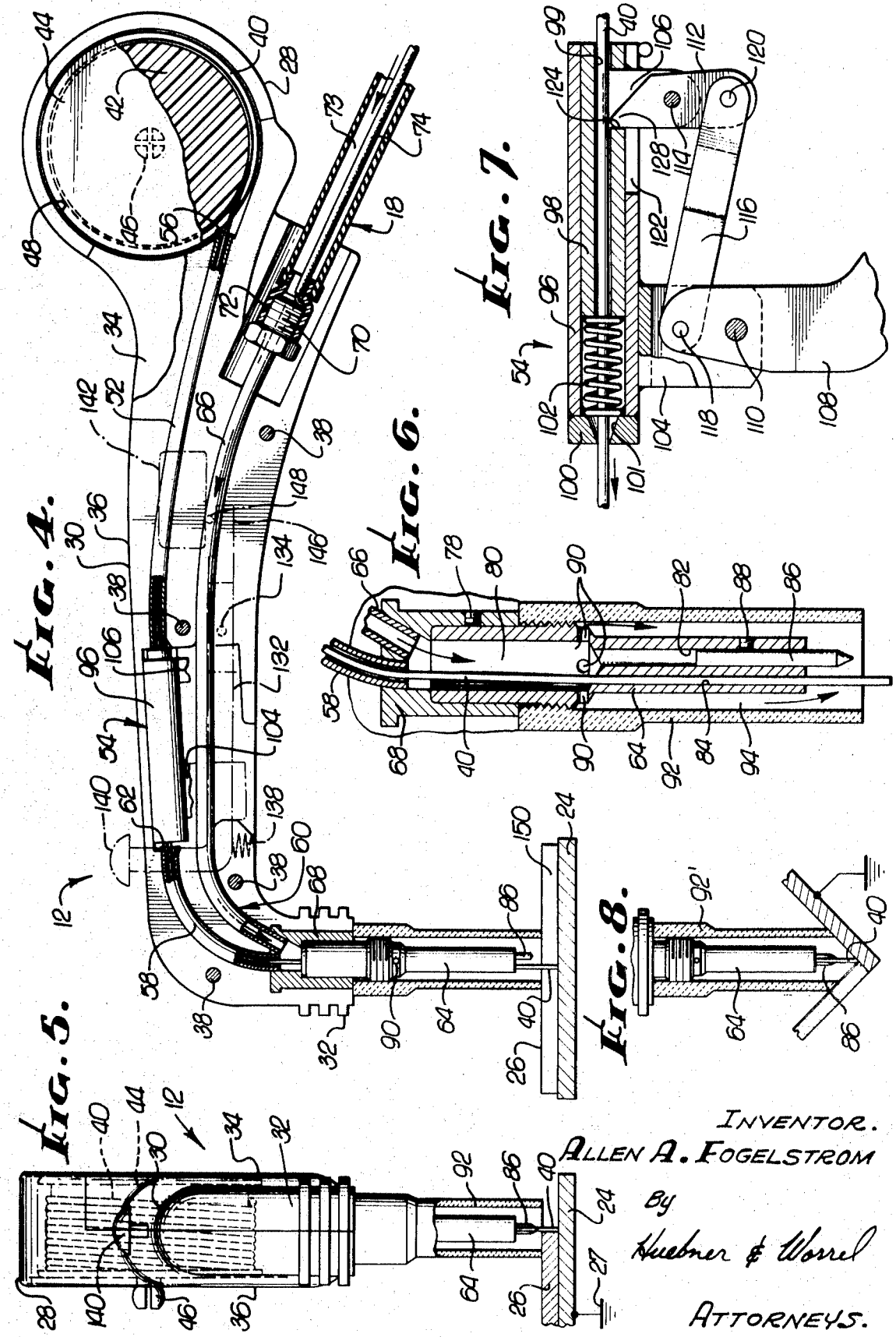

TACK WELDING TORCH

BACKGROUND OF THE INVENTION

Inert-gas-shielded-arc welding is a process well known in the art. Very briefly the welding process is accomplished by means of the heat buildup generated by an electric arc formed between a charged electrode and the metal parts or work pieces to be welded; the work pieces are grounded so as to cause the arc to form. An inert gas, either helium or argon is expelled around the electrode to serve as a conductor between the electrode and the metal parts and to shield the weld from the atmosphere so as to reduce the oxidation of the metal parts and thereby limit contamination or oxidation of the weld.

Although the inert-gas-shielded-arc process is a relatively simple method of welding when compared to other welding processes, it has, nonetheless, required an experienced welder prior to this invention to produce satisfactory welds using this process.

When joining relatively thin metal parts, it is imperative that the welding puddle, the area where the metals are melted and fused, not be so large as to distort the metal parts or leave a warp or depression therein.

Any welds requiring the use of filler metal have, prior to this invention, presented two alternatives. The welder could use both hands, one to hold the welding torch and the other to hold the filler metal rod, adding the rod to the welding puddle as the torch melts both it and the parts to be joined. The second alternative has involved large, bulky, expensive types of welding apparatus employing feed means supplying filler to the weld when the welding current is flowing.

Whichever alternative the welder chose, it was necessary to wear protective clothing, such as a helmet, goggles and gloves while welding because of the sparks created by the process, particularly when filler metal was used. The atmosphere insulating effect of the inert gas was reduced when the electrode was held a distance from the weld sufficient to allow the filler rod to be heated and melted by the arc. Also, a greater amount of spatter and pitting around the weld results when the electrode cannot be held in close proximity to the weld puddle.

SUMMARY OF THE INVENTION

The tack welding torch of this invention is designed to eliminate the problems found in prior art inert-gas-shielded-arc welding torches while improving the advantages inherent in such torches.

The welding torch is light and compact and the tack welding operation may be accomplished with only one hand.

The apparatus of the invention is designed so that an inexperienced welder can achieve highly satisfactory tack weld results.

Because of the enclosure of the electrode and filler metal at the point of contact there is a lack of sparks generated by the torch when in operation.

There is no measurable loss of alloys through oxidation due to the excellent protection of the weld puddle from the atmosphere by the inert gas. While this is an advantage of the inert-gas-shielded-arc welding process in general, the loss of alloys during welding is even farther reduced by this invention.

The invention includes a feed mechanism wherein a welder can add measured amounts of filler metal to a tack weld insuring that the correct amount of filler metal will be used to form the strongest weld possible.

The invention is designed so as to positively indicate to the welder the moment when the preselected amount of filler metal has been deposited on the weld to aid him in determining the length of time that the torch must be applied to the work pieces to complete the weld. The tack welding torch of this invention operates so as to insure the fusing of the filler metal and the work pieces while preventing the fusing or sticking of the filler metal to the torch or electrode.

Finally, the welding torch of this invention produces a clean tack weld having a good appearance because of the complete lack of spattering and pitting around the weld.

DESCRIPTION OF THE DRAWINGS

FIG. 4 is an enlarged, vertical, cross-sectional view of the tack welding torch taken along line 4—4 of FIG. 1;

FIG. 5 is an enlarged front elevational, partly cross-sectional view of the tack welding torch illustrated in FIG. 1;

FIG. 6 is an enlarged, fragmentary, cross-sectional view of the electrode holding portion of the tack welding torch;

FIG. 7 is an enlarged, cross-sectional view of the feed apparatus taken along line 7—7 of FIG. 3; and FIG. 8 is a modification of the tip of the tack welding torch for a fillet weld.

DETAILED DESCRIPTION OF THE PREFERRED EMBODIMENT

Figure 1:
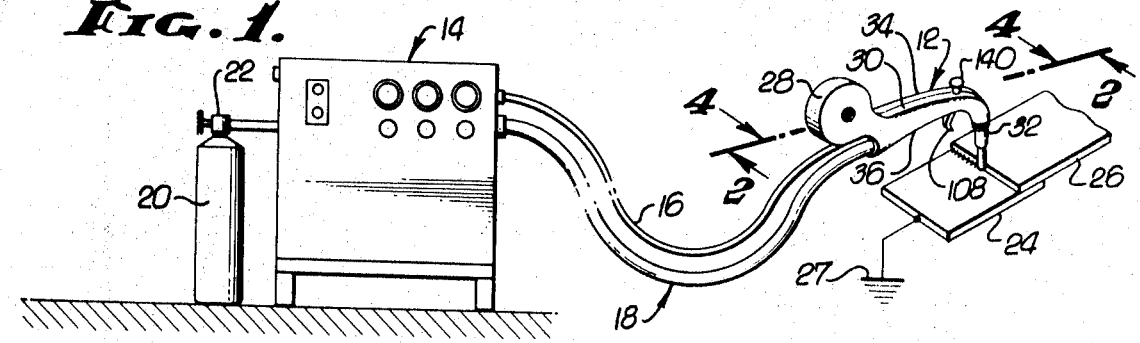
FIG. 1 is an enviromental view of the tack welding torch of this invention connected to an electric welding machine and in position to weld two work pieces.

In FIG. 1 there is illustrated an inert-gas-shielded-arc tack welding torch, generally designated 12, connected to a direct current welding machine, generally designated 14. Torch 12 is connected to a welding machine 14 by means of a microswitch cable 16 and an insulated power and gas cable-hose assembly 18. An inert gas, preferably argon, is supplied from pressure tank 20, having a valve 22 to control the rate of flow of the gas to a torch. The torch 12 is shown in FIG. 1 in position to tack or spot weld metal work pieces 24 and 26, which are grounded at 27.

Torch 12 includes three main portions, a wire spool-holding means 28, a handle means 30, and an electrode holding means 32. The wire spool means 28 extends upwardly relative to the handle means 30 while the electrode holding and shield means 32 extends downwardly generally at a right angle to the major axis of the handle means 30.

Figure 3:
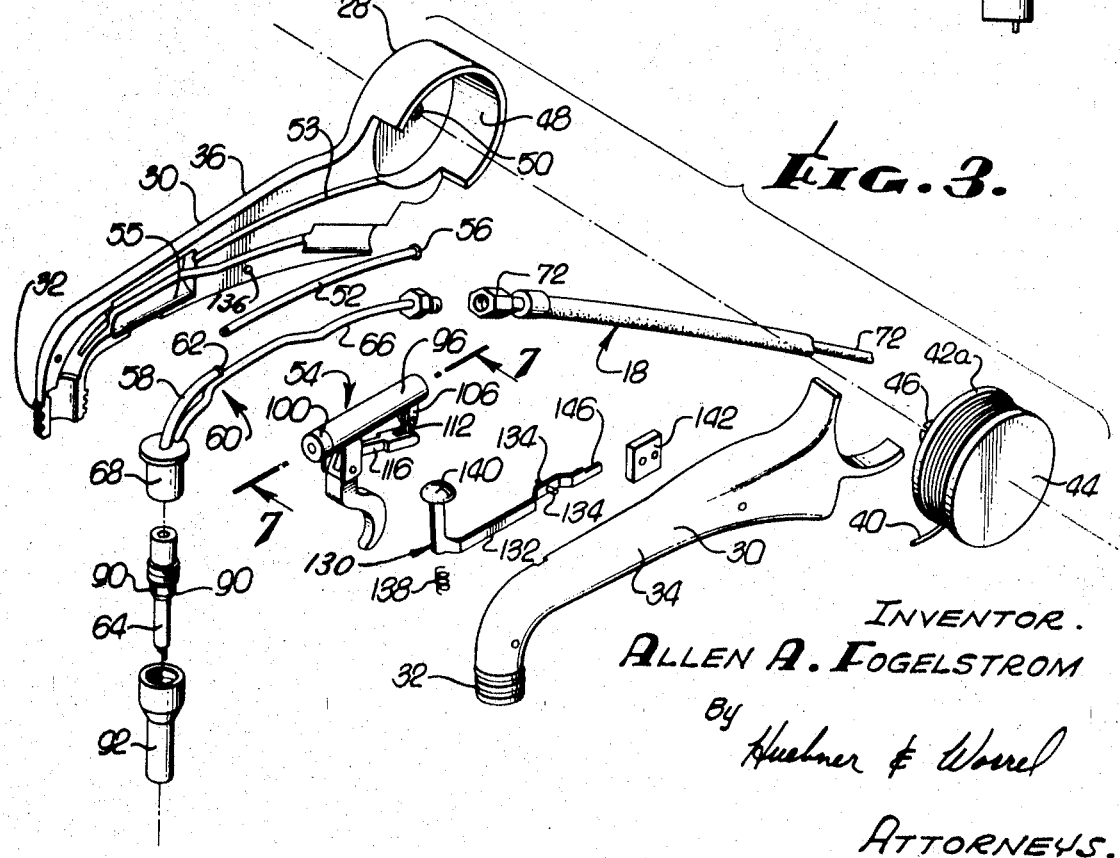
FIG. 3 is an exploded, perspective view of the tack welding torch.

The tack welding torch 12 includes two mating sections of dielectric material, such as nylon, and includes a left handle portion 34 and a right handle portion 36, best seen in FIG. 3. The two handle portions 34 and 36 are held together in any appropriate manner such as by bolts 38. Cavities, such as 53 and 55 in FIG. 3, are molded into handle portions 34 and 36 to receive and hold the interior parts of the torch.

Welding or filler wire 40 is wound laterally across spool 42. The spool 42 has on its left end an end cap 42a and an opposed end cap portion 44. On the cap 42a there is positioned a spherical locking lobe 46 split into four sections. When handle portions 34 and 36 are fastened together a circular opening 48 is created in the left side of spool holding portion 28 of handle 12. Spool 42 is inserted into opening 48 until lobe 46 snap fits through hole 50 in handle portion 36 while spool end cap 44 closes opening 48. As the filler wire 40 is drawn from spool 42 in a means to be described the spool 42 and end cap 44 will rotate within spool-holding portion 28.

Coming off the spool 42, filler wire 40 passes through a feeder tube 52 maintained in cavity 53 into a feed mechanism, generally designated 54 mounted in cavity 55 of right handle portion 36. Feeder tube 52 includes entrance flared portion 56 to facilitate feeding the wire 40 into the tube 52. It is preferred for smooth operation that the diameter of the spool 42 be large enough so that the wire 40 will come off in a direct line with the tube 52.

After being advanced through feed mechanism 54 in a manner to be described, the filler wire passes through a tube 58 of a delivery unit, generally designated 60 in FIG. 3. Tube 58 preferably includes a flare 62 to insure that the wire 40 will pass from feed mechanism 54 into tube 58. Wire 40 then passes through a copper electrode adapter 64 to the tip of the torch.

Delivery unit 60, besides tube 58, also includes a gas and current tube 66, an electrode cap 68 and a male fitting 70.

Cable 18 has a fitting 72 which is screw-fitted onto fitting 70, as shown in FIG. 4. Cable 18 has a hollow central core 73 through which runs a current wire 74. The inert gas also flows through the core 73 into tube 66 which is of a conductive metal so that it is energized when current flows through wire 74.

Electrode adapter 64 is fitted into cap 68, as best seen in FIG. 6, and held therein by a set screw 78 or any other satisfactory manner. Electrode adapter 64 is tubular and has a hollow upper chamber 80, an offset reduced diameter bore 82 and a parallel offset bore 84 communicating with said chamber 80. A tungsten electrode 86 is adjustably held in bore 82 by set screw 88. Filler wire 40 passes through bore 84.

A cup 92 of dielectric material preferably ceramic is screw fitted onto electrode adapter 64, forming an open ended chamber 94. Gas flowing from tube 60 into cap 68 and electrode chamber 80 passes through ports 90 and collects in chamber 94.

The filler wire feed mechanism 54 is best seen in FIG. 7. Inside a hollow tubular housing sleeve 96, there is slidably positioned a tubular plunger 98 having a longitudinal bore 99 therethrough. An annular cap 100 having an inwardly flared bore 101 is mounted on the forward end of sleeve 96. A coil spring 102 is positioned in the bore 99 abutting cap 100 and plunger 98 and urges plunger 98 away from cap 100. U-shaped brackets 104 and 106 depend downwardly in spaced, aligned relationship from sleeve 96 and plunger 98 respectively. Bracket 104 is mounted on and toward the forward end of sleeve 96, while bracket 106 is mounted on the plunger 98 and toward the rearward end of sleeve 96 and extends downwardly through a slot 122 in sleeve 96. A nylon trigger 108 is pivoted at 110 within bracket 104. A feed lever 112 is pivoted at 114 within bracket 106 and extends through a slot 124 into bore 99. Link 116 pivotally connects with trigger 108 at 118 and with feed lever 112 at 120.

Filler wire 40 extends through central bore 99 of plunger 98, through coil spring 102, and through bore 101 of cap 100.

When trigger 108 is pulled rearwardly, link 116 causes feed lever 112 to pivot so that tip 128 of lever 112 forces wire 40 upwardly in plunger bore 99 until the wire is held in an immovable fit relative to plunger 98. Further pulling of trigger 108 will slide plunger 98 and locked wire 40 forwardly toward cap 100 depressing spring 105. When the trigger 108 is released the wire 40 is released and the spring 105 will force the plunger 98 rearwardly and the frictional fit of the wire either in the cap 100 or bore 84 will retain it in the advanced position. Repeated trigger activation will feed wire 40 further forward and out bore 84 in the direction of the arrow in FIG. 7.

Figure 2:
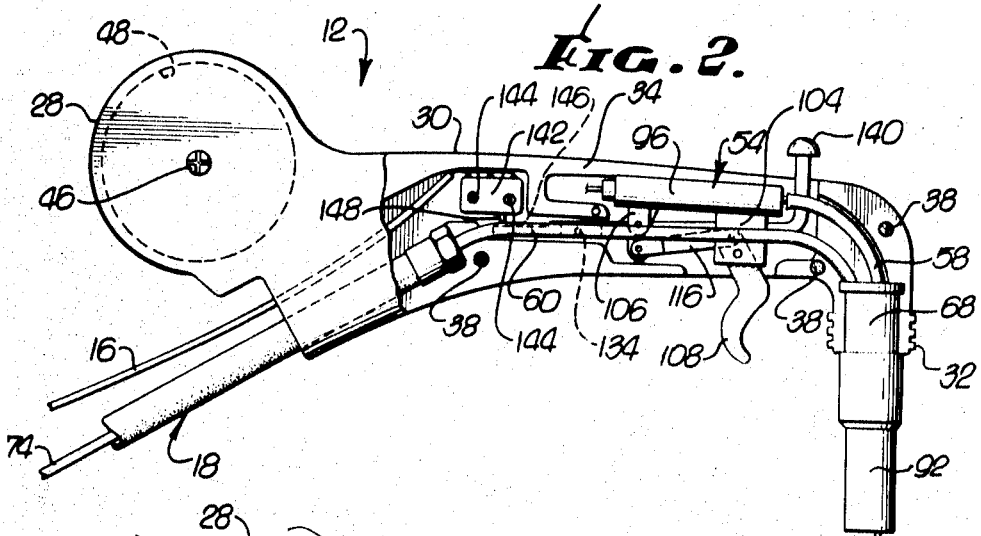
FIG. 2 is an enlarged, side elevation view of the tack welding torch partially broken away to show the interior thereof, taken along line 2—2 of FIG. 1.

There is also provided a current control means 130 including a lever 132 which pivots on pins 134 in holes 136 in the handle portions 34 and 36; a spring 138 normally urges the lever 132 and a thumb button 140 on said lever upwardly out of handle portion 30. The button is of a dielectric material such as nylon. Depressing button 140 closes a standard microswitch 142 mounted in handle portion 34 by screws 144, as seen in FIG. 2, when activating end 146 of lever 132 depresses switch button 148 of switch 142. Releasing button 140 deactivates or opens microswitch 142 as spring 138 returns lever 132 to its normal position.

In operation, welding wire 40 is projected through electrode adapter 64 and beyond ceramic cup 92, as shown in the drawings. The length of the extension depends on the type of tack weld being made.

The gas supply is then turned on and gas flows through hose 18, tube 66, cap 68, electrode chamber 80, ports 90 and into chamber 91, as shown by flow arrows in FIGS. 4 and 6, to completely surround wire 40 and electrode 86, thereby shielding wire 40 and electrode 86 from the atmosphere and enabling the weld to be made without splatter, sparks, fumes or excessive oxidation with the atmosphere.

The electrode portion 32 of the torch 12 is then positioned over the spot where the weld is to be made so that the extended portion of wire 40 is held against the work pieces to be joined at the desired point. Pushing down on the torch handle 30 until ceramic cup 92 bears against work piece 26 forces any excess welding wire 40 back into the torch 12.

FIGS. 4 and 5 illustrate the proper positioning of the torch for a lap tack weld. Torch 12 is held so that wire 40 and tungsten electrode 86 lie along the same plane as wall 150 of work piece 26.

After proper positioning of the torch, button 140 is depressed causing lever 132 to activate or close microswitch 142. In turn microswitch 142, connected to welding machine 14 through microswitch cable 16, activates the welding machine thereby causing current to flow through wire 14 of hose 18. The current is conducted along tube 66 and cap 68 to electrode adapter 64. The welding machine is preferably set for a power output of 50 to 55 amperes and straight polarity.

A dead short caused by energized wire 40 touching the grounded metal will melt that portion of wire 40 protruding below electrode adapter 64. The areas of the work pieces adjacent the wire will begin to melt at the same time. When melted wire 40 drops onto the work pieces, the path of least resistance from the adapter 64 to the work pieces 24 and 26 will be through tungsten electrode 86 with the result that an electric arc will jump from the electrode 86 to the deposit metal puddle, performing the fusing operation but preventing the fusing or sticking of wire 40 to the electrode adapter 64 or electrode 86.

The arc produces a blue flash, at which time the operator should release button 140 to open microswitch 142 and thereby cut off the flow of current from the welding machine 14. Average reaction time of the operator is normally enough time to adequately fuse the metal deposit to the joint being welded and the tack weld is thus completed. The flow of gas may be shut off or additional welds may be made following the above described procedure.

FIG. 8 illustrates a modification of the cup 92 for fillet tack welds. There is provided a ceramic cup 92' having an angled tip so that the extension of wire 40 and electrode 86 are completely enclosed by cup 92' and the work pieces to be joined with wire 40 and electrode 86 is in line with the joint. This is desirable to confine the arc and prevent it from forming between electrode 86 and parent metal on the side of the joint. Should such confinement not be maintained a sloppy and weak tack weld would result.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

What is claimed is:

1. A hand-held tack welding torch for use with a current source and an inert gas supply, said torch comprising: a handle means of dielectric material, said handle means including a source of welding wire; coupling means on said handle adapted to receive connections to said current source and said inert gas supply; a common gas and current passage means extending through said handle adapted to convey current and gas from said current source and said inert gas supply; a dielectric insulating inert gas shield means projecting from said handle and communicating with said passage, said shield means adapted to surround and abut an area to be welded and to confine said gas; a feed mechanism within said handle operable by finger pressure to advance said welding wire through said handle and into said shielding means; wherein said feed mechanism includes a hollow tubular sleeve housing having a forward and rear portion, a tubular plunger slidably mounted in said sleeve housing and having a longitudinal bore therethrough adapted to receive said welding wire, aligned slots in said sleeve housing and said plunger, a spring biasing said plunger rearwardly in said sleeve housing, finger trigger means on said handle; including a trigger associated with said sleeve and further including a wire engaging portion extending through said aligned slots whereby activation of said trigger will cause engagement and advancement of said welding wire forwardly from said sleeve housing an adjustable electrode means mounted within said dielectric insulating inert gas shield means proximate and generally parallel with said welding wire; and current control means mounted on said handle and connected to said electrode whereby said electrode may be energized and a tack weld produced in the area defined by said dielectric insulating inert gas shield means.

2. A hand-held tack welding torch for use with a current source and an inert gas supply, said torch comprising:
- a handle means of dielectric material, said handle means including a source of welding wire;
- coupling means on said handle adapted to receive connections to said current source and said inert gas supply;
- a common gas and current passage means extending through said handle and adapted to convey current and gas from said current source and said inert gas supply, said passage including a current conductive and gas delivery tube, an electrode cap fitted on said delivery tube having a chamber communicating with said delivery tube;
- a dielectric insulating inert gas shield means projecting from said handle and communicating with said passage, said shield means adapted to surround and abut an area to be welded and to confine said gas:
- a wire feed mechanism on said handle including a hollow tubular sleeve housing within said passage having a forward and rear portion, a tubular plunger slidably mounted in said sleeve housing and having a longitudinal bore therethrough adapted to receive said welding wire, aligned slots in said sleeve housing and said plunger, a spring biasing said plunger rearwardly in said housing, finger trigger means on said handle including a trigger associated with said sleeve and further including a wire-engaging portion extending through said aligned slots whereby activation of said trigger will cause engagement of and advancement of said welding wire forwardly from said sleeve housing through said handle and into said shielding means;
- an electrode adapter secured to said electrode cap and communicating with said chamber said adapter retaining an adjustable electrode means and having a guide to maintain said welding wire generally parallel with said electrode through said inert gas shield means to the area to be tack welded; and
- current control means mounted on said handle and connected to said electrode whereby said electrode may be energized and a tack weld produced in the area defined by said dielectric insulating inert gas shield means.

* * * * *